(12) United States Patent
Kim et al.

(10) Patent No.: US 8,236,437 B2
(45) Date of Patent: Aug. 7, 2012

(54) BATTERY CASE COVER

(75) Inventors: Dae-Ung Kim, Gwangju (KR);
Kyu-Hyeong Lee, Gwangsan-gu (KR);
Nam-Il Kim, Gwangju (KR)

(73) Assignee: Global Battery Co., Ltd., Seoul (KR)

( * ) Notice: Subject to any disclaimer, the term of this patent is extended or adjusted under 35 U.S.C. 154(b) by 694 days.

(21) Appl. No.: 12/441,460

(22) PCT Filed: Mar. 16, 2007

(86) PCT No.: PCT/KR2007/001303
§ 371 (c)(1),
(2), (4) Date: Mar. 16, 2009

(87) PCT Pub. No.: WO2008/056859
PCT Pub. Date: May 15, 2008

(65) Prior Publication Data
US 2010/0178552 A1    Jul. 15, 2010

(30) Foreign Application Priority Data
Nov. 7, 2006   (KR) .................. 10-2006-0109562

(51) Int. Cl.
*H01M 2/12* (2006.01)

(52) U.S. Cl. ............ 429/53; 429/57; 429/72; 429/82; 429/89; 429/175

(58) Field of Classification Search .......... 429/53, 429/57, 71–75, 82, 84, 89, 95, 175
See application file for complete search history.

(56) References Cited

U.S. PATENT DOCUMENTS

| | | | |
|---|---|---|---|
| 4,009,322 A | 2/1977 | Wolf | |
| 4,374,187 A | 2/1983 | Sano | |
| 5,683,830 A | 11/1997 | Fritts et al. | |
| 6,022,638 A * | 2/2000 | Horton et al. | 429/187 |
| 2003/0059669 A1 * | 3/2003 | Mittal et al. | 429/82 |

OTHER PUBLICATIONS

International Search Report from corresponding PCT/KR2007/001313, Aug. 7, 2007.

* cited by examiner

*Primary Examiner* — Patrick Ryan
*Assistant Examiner* — Ben Lewis
(74) *Attorney, Agent, or Firm* — Maier & Maier PLLC (57) ABSTRACT

Provided is a battery case cover which can be produced through a single process, by integrally forming the structural components of a battery case cover such as a recovering part, a cell partition part and a gas inlet part on the bottom surface, while forming the recovering part in the shape of a pipe and applying a vent cap mode to the gas inlet part.

9 Claims, 7 Drawing Sheets

BATTERY CASE COVER

RELATED APPLICATIONS

This application claims priority, under 35 U.S.C. §119, to International Patent Application No.: PCT/KR2007/001303, filed on Mar. 6, 2007, which claims priority to Korean patent application No.: 10-2006-0109562, filed Nov. 7, 2006, the disclosures of which are incorporated by reference herein in its entirety.

TECHNICAL FIELD

The present invention relates to a battery case cover, specifically to a battery case cover which closes an electrolytic bath part of a battery using an electrolyte.

BACKGROUND ART

Batteries (electric cells) are generally classified into two types, such as a primary battery and a secondary battery which is possible to be charged or discharged, among which, a large capacity battery is comprised of a structure using an electrolyte.

Since an electrolyte is usually in the form of a solution, it should be provided with several safety devices. Firstly, the electrolyte should not be leaked out, while gases generated by chemical reactions should be emitted outside in order to prevent explosion of a battery. Generally, such functions are achieved by a battery case cover which covers an electrolytic bath (battery case) containing an electrolyte.

Figure 1:
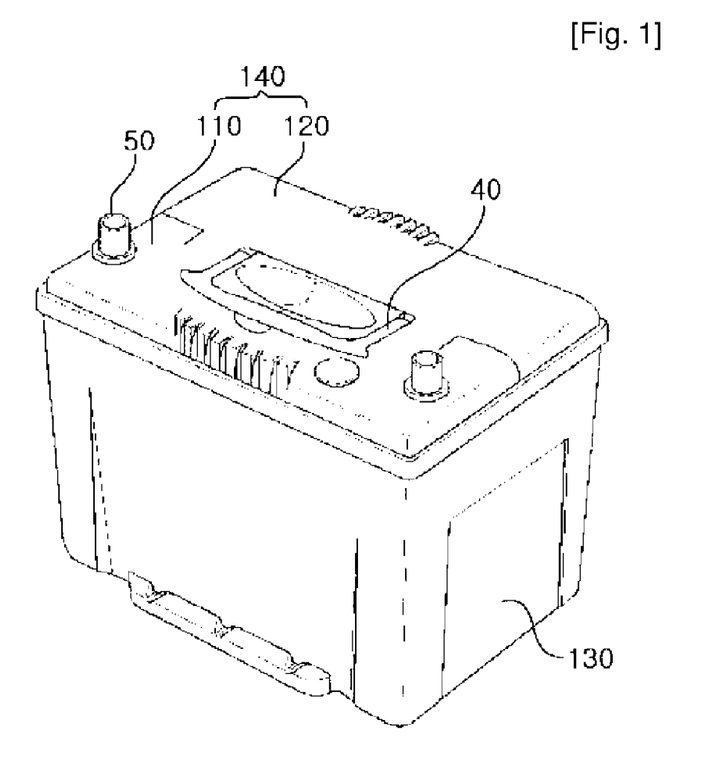
FIG. 1 is a perspective view showing a battery equipped with a conventional battery case cover.

FIG. 1 is a perspective view showing a battery equipped with a conventional battery case cover. Referring to FIG. 1, conventional batteries are generally comprised of an electrolytic bath (130) where an electrolytic solution is charged and a battery case cover (140) covering the electrolytic bath (130).

The battery case cover (140) is comprised of two different regions of an upper cover (120) and a lower cover (110) where a terminal (50) and a handle receiving part (40) are formed.

Figure 2:
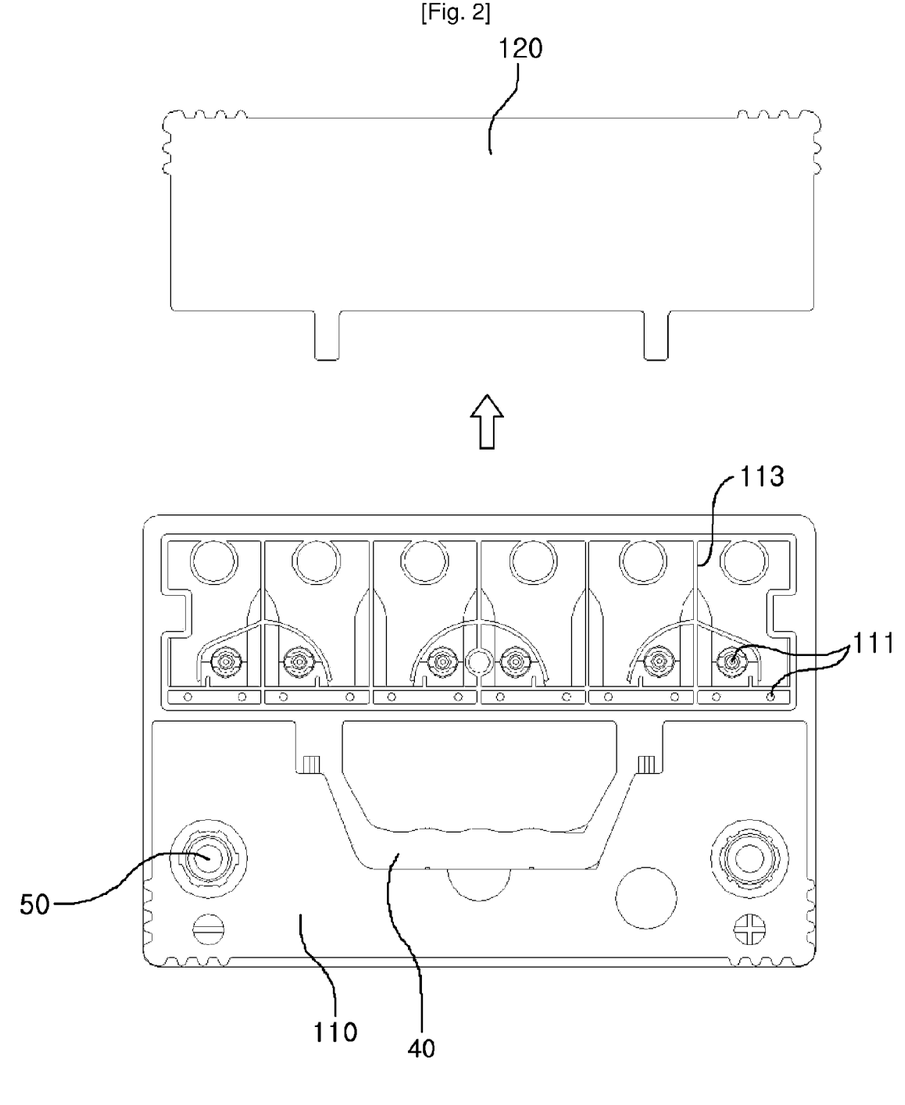
FIG. 2 is a plan view of a conventional battery case cover.

FIG. 2 is a plan view of a conventional battery case cover, showing an upper cover (120) and a lower cover (110) in disassembled state.

DISCLOSURE OF INVENTION

Technical Problem

Figure 3:
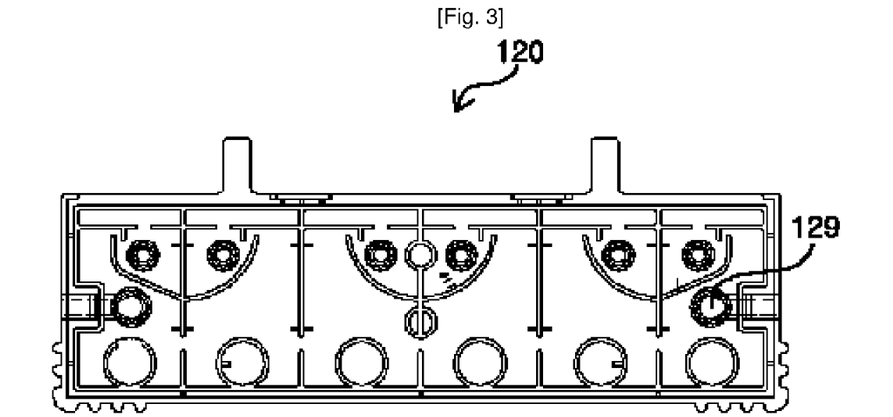
FIG. 3 is a schematic view showing the bottom surface of an upper cover of a conventional battery case having a two-layer structure.

The lower cover (110) also provides with, in addition to a terminal (50) and a handle receiving part (40), a recovering hole (111) at the part which is covered up by the upper cover (120) and a separation wall (113) corresponding to a cell formed in the electrolytic bath; and the bottom surface of the upper cover (120) provides with, as it is illustrated in FIG. 3, a separation wall corresponding to the separation wall and an explosion proof filter (129) which allows emission of the gases flown from the recovering hole (111) while preventing the electrolyte from being passed therethrough. The explosion proof filter (129) also has a function of not allowing waste gasses or electrolytes inside the battery case to respond to ignition occurred outside, thereby preventing explosion of a battery.

Figure 4:
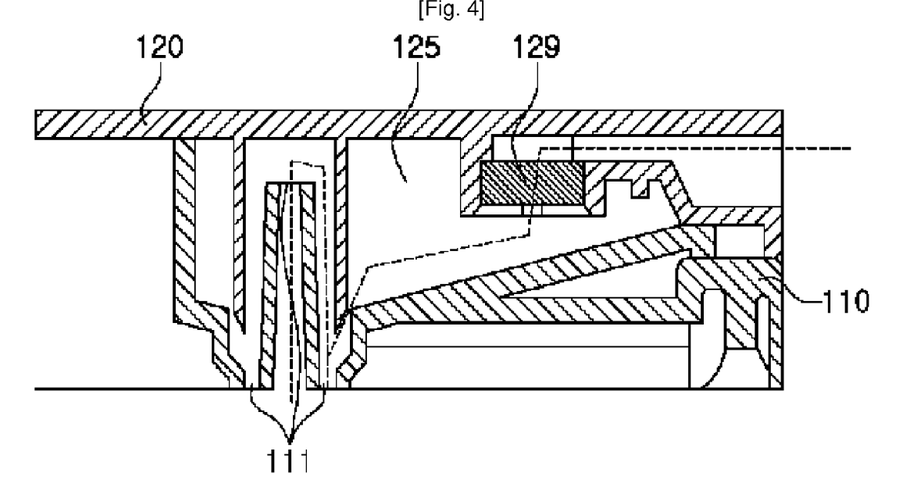
FIG. 4 is a cross-sectional view of FIG. 2.

Reviewing the cross-section of a conventional battery case cover having a structure described in the above by referring to FIG. 4, it forms a labyrinth structure in which the upper cover (120) covers the area surrounding the raised recovering hole (111), which is to prevent electrolytes introduced through the recovering hole from being easily flown into the recovering part (125) that is an area formed by the coupling of the upper cover with the lower cover. The recovering hole located in the lower part is placed to return the electrolyte introduced into the recovering part (125) to the electrolytic bath.

As it has been described so far, a conventional battery case cover, particularly the inside of the same should be formed considering: prevention of easy inflow of electrolytes; emission of waste gases; prevention of explosion; and replacement of electrolytes introduced into the recovering part, etc., therefore it is currently manufactured as a double-layered structure of the upper and the lower part.

However, such double-layered structure requires processes for forming each upper and lower part and for engaging the upper cover with the lower cover, etc., thus having a problem of low productivity.

Technical Solution

The present invention has been created so as to solve above-mentioned problems of prior arts. Therefore, the object of the present invention is to provide a battery case cover having a single layered structure of which production can be achieved in easy and convenient way.

For achieving above-represented objects, a battery case cover which uses an electrolyte is characterized by comprising: a cell partition part formed on the bottom surface of the case cover as a part thereof in a way of corresponding to the cell partitions of the battery case; a recovering part in the shape of a pipe which is integrally formed with the case cover and the cell partition part, passing from one side of a bottom surface of the case cover, through the cell partition part, to the other side; and a gas inlet part, at least one of which is provided in each cell defined by the cell partition part, in a way of being integrally formed with the recovering part, so that a gas generated in the battery is flown into the gas inlet part It is preferred that the recovering part preferably comprises a hole under the base of a certain area where the gas inlet part is not placed, and at each end of the recovering part, an explosion proof filter part is preferably placed.

Further, it is preferred that a handle receiving part which a handle can rest on, is formed on the top surface of the cover.

It is further preferred that a gas inlet part is formed integrally with the recovering part, such that the lower part of the gas inlet part faces down, forming the shape of T, wherein the inner structure of the gas inlet part is a labyrinthine structure. Preferably, the bottom surface of the gas inlet part is closed and has a hole on the bottom surface of one side. Further, it is preferred that the bottom surface of the gas inlet part is formed in a vent-cap mode in which the structure of the bottom surface is open at the time of production, and later closed by a certain pressure after the production.

NUMERALS USED IN MAJOR PARTS IN DRAWINGS 140, 200 . . . battery case cover
130, 300 . . . electrolytic bath (battery case)
110 . . . lower cover 120 . . . upper cover
113 . . . separation wall 111, 211, 273 . . . recovering hole
50, 250 . . . terminal 40, 240 . . . handle receiving part
129, 291 . . . explosion proof filter
125, 270 . . . recovering part
293 . . . filter housing
290 . . . explosion proof filter part
210 . . . gas inlet part 230 . . . cell partition part
213 . . . cap 215 . . . labyrinth
310 . . . cell partition

MODE FOR THE INVENTION

Figure 5:
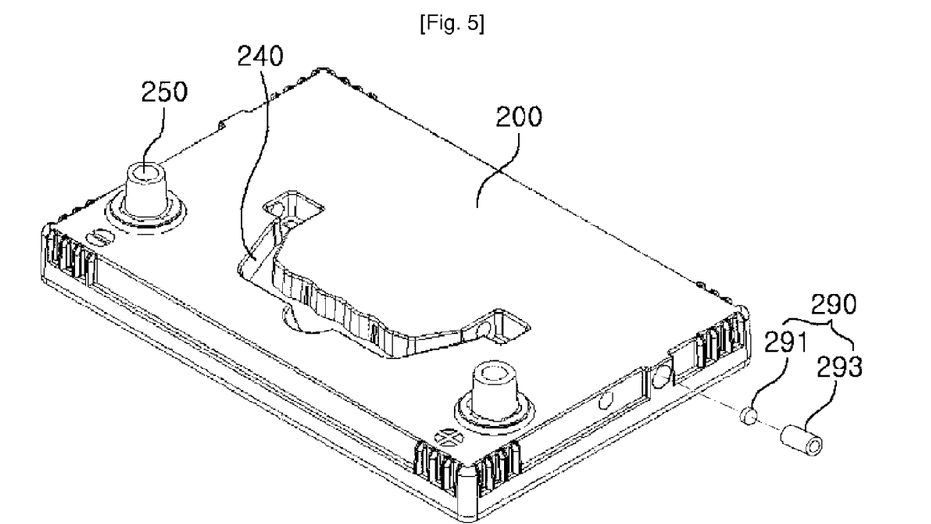
FIG. 5 is a perspective view showing a battery case cover according to one preferred embodiment of the present invention.
Figure 6:
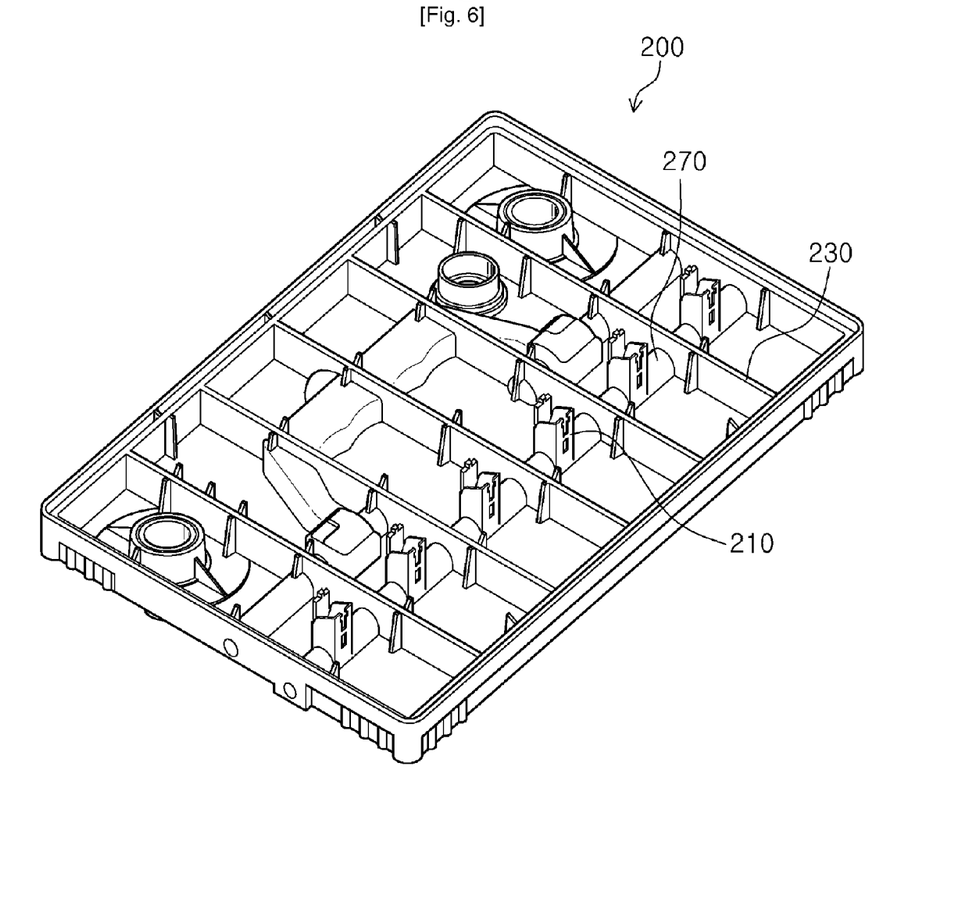
FIG. 6 is a view showing the bottom surface of FIG. 5.

Hereinafter, one preferred embodiment of the present invention is further described in detail, with referring to the accompanying drawings FIG. 5 is a perspective view showing a battery case cover according to one preferred embodiment of the present invention, and FIG. 6 is a view showing the bottom surface of FIG. 5.

With referring to FIGS. 5 and 6, it is found that the battery case cover (200) according to the embodiment of the present invention comprises a cell partition part (230) formed on the bottom surface of the case cover (200) as a part thereof in a way of corresponding to the cell partitions of the battery case; a recovering part (270) in the shape of a pipe which is integrally formed with the case cover and the cell partition part, passing from one side of a bottom surface of the case cover, through the cell partition part, to the other side; and a gas inlet part (210), at least one of which is provided in each cell defined by the cell partition part, in a way of being integrally formed with the recovering part, so that a gas generated in the battery is flown into the gas inlet part.

The cell partition part (230) is a part coupled with a separation wall (cell partition) of a case in corresponding way, wherein the separation wall is formed while forming multiple layers of cells which contain electrolytes in the main body of the battery case. For facilitating its coupling to the separation wall of the battery case, it is preferred to form guides to said cell partition part.

The recovering part (270) is a path for emitting waste gases generated from the chemical reactions of electrolytes inside a battery, particularly, it is formed in the shape of a pipe so that the inner cavity of the same functions as a pass for the waste gases. Further, the recovering part also functions as a buffer which prevents electrolytes from being directly contacted with an explosion proof filter, when electrolytes are reached to a battery case cover owing to a certain impact or tilt, etc. At each end of the recovering part, an explosion proof filter part (290) is placed so as to discharge the waste gases, but to prevent electrolytes from being leaked. Further, the explosion proof filter part carries out a function of preventing outside heat from being entered into the inside of the battery case, thereby preventing the explosion of a battery. The explosion proof filter part preferably comprises a filter housing (293) which is coupled to each end of the recovering part; and an explosion proof filter (291) placed in the filter housing, for contemplating a strong coupling of the explosion proof filter part as well as protecting the explosion proof filter from harmful factors from outside.

The gas inlet part (210) is a part where waste gases generated in a battery are introduced, and has holes (recovering holes) for introduction of such waste gases.

In the meanwhile, with respect to the recovering part (270), other additional holes on the certain bottom surface of a part where the gas inlet (210) is not located, may be formed. This is for manufacturing a battery case according to this embodiment of the present invention through one-step process, wherein the battery case has a cell partition part (230), a recovering part (270) and a gas inlet part (210) all of which are integrally formed as one body. Undoubtedly, such process is also possibly done without separate holes, but it demands elaborate works, and the holes formed as such can be function as recovering holes.

On the other hand, on the upper surface of the battery case cover according to this embodiment of the present invention, preferably, a terminal (250) and a handle receiving part (240), as it is common in conventional ones, are formed.

Figure 7:
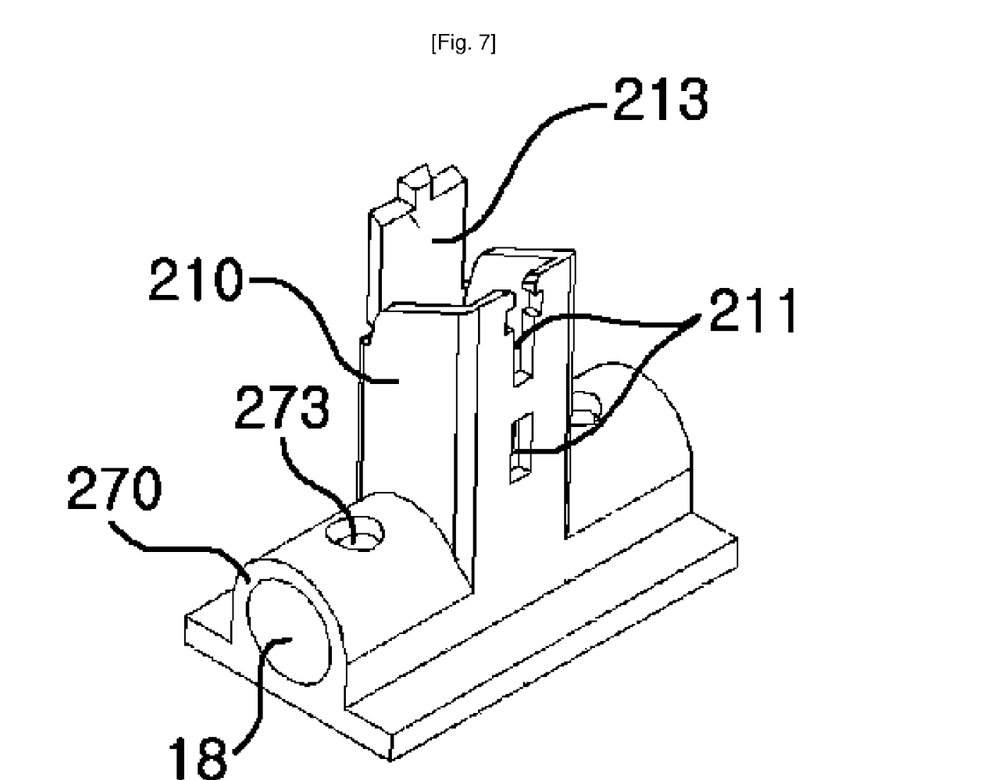
FIG. 7 is a perspective view showing a gas inlet part of a battery case cover according to one preferred embodiment of the present invention.

FIG. 7 is a perspective view showing a gas inlet part of a battery case cover according to one preferred embodiment of the present invention.

FIG. 7 is a cross-section at each end of the recovering part (270) where the gas inlet part (210) is integrally connected. With respect to this, the lower part of the gas inlet part (210) faces downward (FIG. 7 shows the state the cover is turned inside out), forming the shape of T, to be integrally connected to the recovering part.

It is preferred that the gas inlet part (210) has a labyrinth structure (not shown) inside, and the bottom surface of the gas inlet part is closed and has a hole on the bottom surface of one side. In this case, the recovering hole (211) for introducing waste gases is preferably formed on a side of the lower part. At this time, the structure of the bottom surface is formed in a vent-cap (213) mode in which the bottom surface is open at the time of production, and later closed by a certain pressure after the production, so as to facilitate the production. Through this, the gas inlet part is formed through a single step in the manufacturing process and later the bottom surface of the gas inlet is closed through a simple process of pressurizing the cap (213).

When unwanted electrolytes are entered through a recovering hole (211) formed on the gas inlet part, the path through which the electrolytes are entered directly is blocked by the labyrinth formed inside the gas inlet.

Further, by forming separate recovering holes (273) on a certain place in the recovering part other than the location of the gas inlet part (210), it is intended to provide a function as a recovering hole (273) and simultaneously to facilitate to manufacture the battery case cover through a one-step process.

Figure 8:
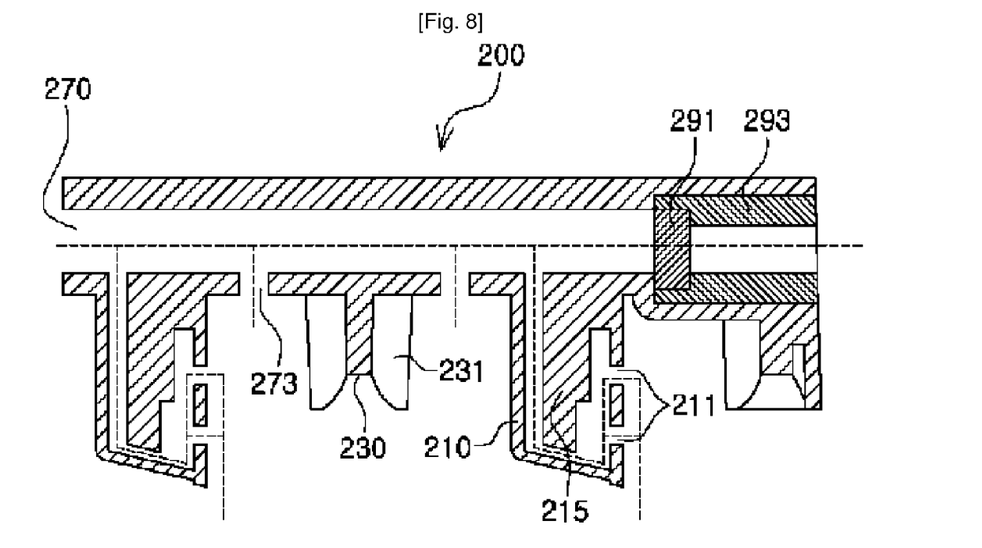
FIG. 8 is a cross-sectional view of FIG. 5.

FIG. 8 is a cross-sectional view of another battery case cover according to a preferred embodiment of the present invention, which is comprised of a recovering part (270) which functions as a path for a waste gas and an introduced electrolyte, and a cell partition part (230) which is integrally formed with said recovering part and coupled to a separation wall for dividing cells in a case (electrolytic bath).

In such structure, the waste gases move along the dotted line shown in the figure, and although electrolytes are entered through a recovering hole (211) formed in the gas inlet part, it is difficult that they reach the recovering part owing to the labyrinth structure. When a battery is tilted excessively, it is, of course, possible that the electrolytes are introduced through the recovering holes (273). However, the inflow would be only very small amount, since the recovering part formed in the recovering part is placed higher than the position of the gas inlet part; the part having a recovering hole is the opposite part of a place where electrolytes are present, i.e. the recovering hole faces the gas inlet part; and such inflow is affected by the pressure inside the recovering part. Further, although a certain amount of electrolytes are introduced, they can be returned to an electrolytic bath through the recovering hole formed in the recovering part.

In the meantime, when the recovering part has electrolytes, if any, by unwanted reasons, it is allowed to flow in the lower part (by gravity) of the inside of the recovering part, thereby leading the waste gases to flow along the upper part of the inside of the recovering part.

To each end of the recovering part, an explosion proof filter part comprised of the explosion proof filter (291) mentioned in the foregoing description and a filter housing (293) is coupled.

The labyrinth (215) in the gas inlet part is formed by raising the corresponding part of the bottom surface of the recovering part (270) inside said gas inlet part. In forming such structure, a manufacturing process using a recovering hole (273) formed in the recovering part is required. However, actually, it is not that the labyrinth (215) itself forms a labyrinthine structure, but it is formed together with the inner wall of the gas inlet part.

Figure 9:
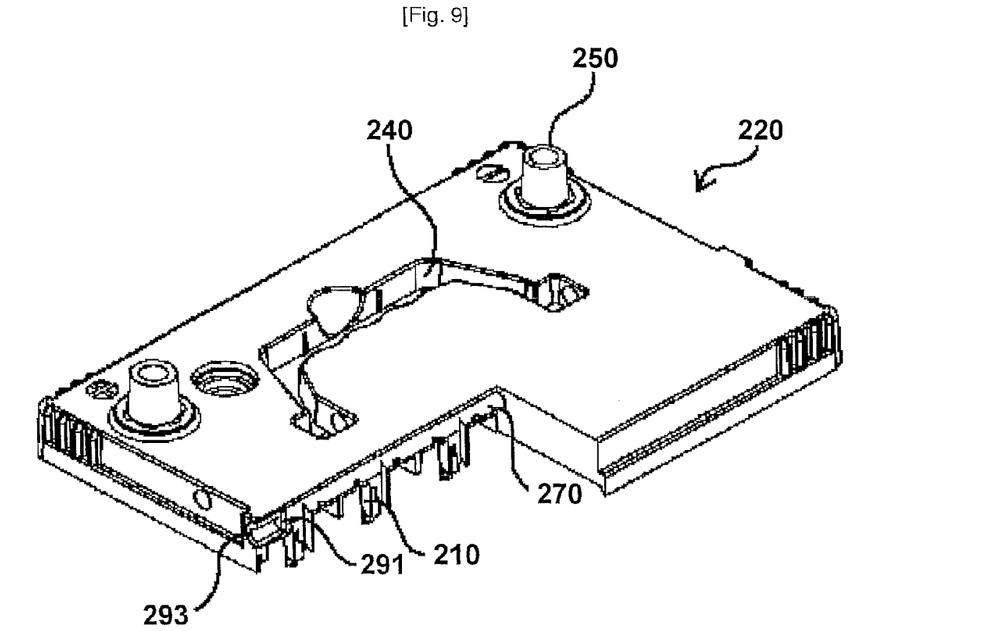
FIG. 9 is a perspective view of a partial cross section of a battery case cover according to one preferred embodiment of the present invention.
Figure 10:
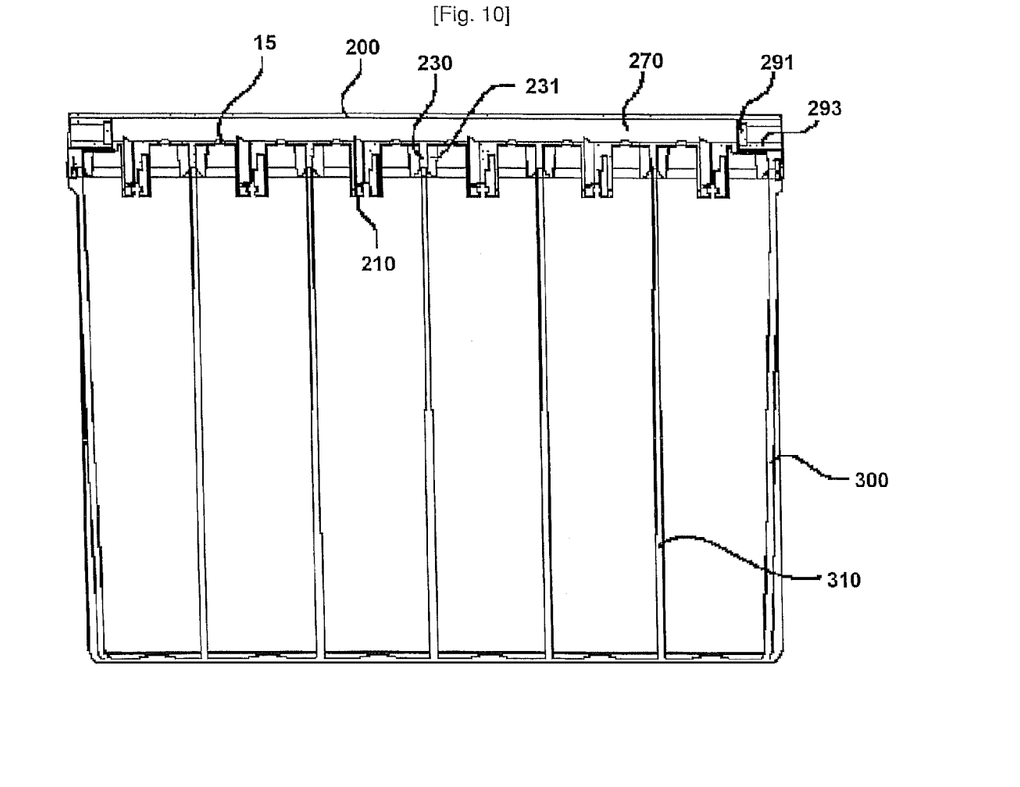
FIG. 10 is a cross-sectional view of a battery coupled to a battery case cover according to one preferred embodiment of the present invention.
Figure 11:
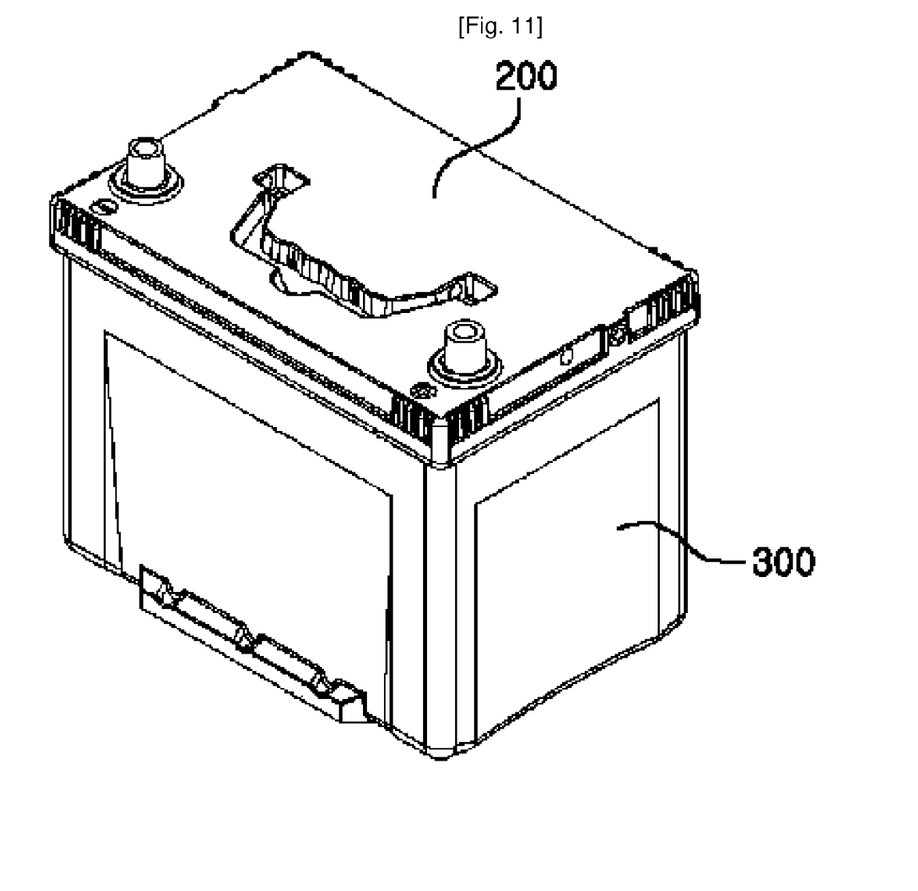
FIG. 11 is a perspective view of FIG. 10.

FIG. 9 is a perspective view of a partial cross section of a battery case cover according to one preferred embodiment of the present invention, through which the interrelationship between the components described in the forgoing illustrations referring to figures is clearly shown. A cross-sectional view and a perspective view of such battery case cover being equipped to a battery case (electrolytic bath) are shown in FIGS. 10 and 11, respectively.

A battery case cover (200) which is comprised of: a cell partition part (230) formed on the bottom surface of the case cover (200) as a part thereof in a way of corresponding to the cell partitions (separation walls) (310) of the battery case (electrolytic bath) (300) and a guide (231) for facilitating its coupling to the cell partitions; a recovering part (270) in the shape of a pipe which is integrally formed with the case cover and the cell partition part, passing from one side of a bottom surface of the case cover, through the cell partition part, to the other side; and a gas inlet part (210), at least one of which is provided in each cell defined by the cell partition part, in a way of being integrally formed with the recovering part, is coupled to a battery case (electrolytic bath) (300). Owing to such structure, the outer appearance is much simple and clean, as compared to a conventional second layered-structure.

INDUSTRIAL APPLICABILITY

As it has been described so far, the present invention according to the present invention makes the structure and production of the battery case cover simple and easy, and the durability of the same will be increased owing to a single-layered structure in which each component is formed as one body, thereby improving the reliability of the resulted product. Further, it is possible to provide neat and clean outer appearance.

The invention claimed is:

1. A battery case cover which uses an electrolyte, comprising:
   a cell partition part formed on the bottom surface of the case cover as a part thereof in a way of corresponding to the cell partitions of the battery case;
   a recovering part in the shape of a pipe which is integrally formed with the case cover and the cell partition part, passing from one side of a bottom surface of the case cover, through the cell partition part, to the other side; and a gas inlet part, at least one of which is provided in each cell defined by the cell partition part, in a way of being integrally formed with the recovering part, so that a gas generated in the battery is flown into the gas inlet part,
   wherein the recovering part comprises a recovering hole in an area where the gas inlet part is not placed.

2. The battery case cover according to claim 1, wherein the recovering part comprises an explosion proof filter part on each end thereof.

3. The battery case cover according to claim 2, wherein the explosion proof filter part further comprises: a filter housing which is coupled to each end of the recovering part; and an explosion proof filter placed in the filter housing.

4. The battery case cover according to claim 1, wherein a handle receiving part which can keep the handle, is formed on the top surface of the cover.

5. The battery case cover according to claim 1, wherein the gas inlet part is formed integrally with the recovering part, such that the lower part of the gas inlet part faces down, forming the shape of a T.

6. The battery case cover according to claim 5, wherein the inner structure of the gas inlet part is a labyrinthine structure.

7. The battery case cover according to claim 6, wherein the bottom surface of the gas inlet part is closed and at least a hole is provided on one side of the gas inlet part.

8. The battery case cover according to claim 5, wherein the bottom surface of the gas inlet part is closed and at least a hole is provided on one side of the gas inlet part.

9. The battery case cover according to claim 8, wherein the bottom surface of the gas inlet part is formed in a vent-cap mode in which the structure of the bottom surface is open at the time of production, and later closed by a certain pressure after the production.

* * * * *